(12) United States Patent
Kato

(10) Patent No.: US 10,672,424 B2
(45) Date of Patent: Jun. 2, 2020

(54) DISK DRIVE WITH BASE AND COVER

(71) Applicants: Kabushiki Kaisha Toshiba, Minato-ku, Tokyo (JP); Toshiba Electronic Devices & Storage Corporation, Minato-ku, Tokyo (JP)

(72) Inventor: Yasuhiko Kato, Setagaya Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/284,308

(22) Filed: Feb. 25, 2019

(65) Prior Publication Data

US 2020/0082847 A1 Mar. 12, 2020

(30) Foreign Application Priority Data

Sep. 10, 2018 (JP) ................. 2018-168876

(51) Int. Cl.
| | | |
|---|---|---|
| *G11B 5/60* | (2006.01) | |
| *G11B 33/14* | (2006.01) | |
| *G11B 5/012* | (2006.01) | |
| *G11B 33/02* | (2006.01) | |
| *G11B 25/04* | (2006.01) | |
| *G11B 5/00* | (2006.01) | |

(52) U.S. Cl.
CPC ............ *G11B 5/6005* (2013.01); *G11B 5/012* (2013.01); *G11B 25/043* (2013.01); *G11B 33/022* (2013.01); *G11B 33/148* (2013.01); *G11B 33/1486* (2013.01); *F16C 2370/12* (2013.01); *G11B 2005/0005* (2013.01); *G11B 2220/2508* (2013.01)

(58) Field of Classification Search
CPC ... G11B 5/6005; G11B 33/022; G11B 33/148; G11B 33/1486; G11B 25/043; G11B 5/012; G11B 2220/2508; G11B 2005/0005; F16C 2370/12
See application file for complete search history.

(56) References Cited

U.S. PATENT DOCUMENTS 6,721,128 B1 * 4/2004 Koizumi ............ G11B 33/1466
    360/99.21
7,218,473 B2 * 5/2007 Bernett ............. G11B 33/1466
    29/603.03
(Continued)

FOREIGN PATENT DOCUMENTS

JP 2007-280555 A 10/2007
JP 2007-328880 A 12/2007

*Primary Examiner* — Brian E Miller
(74) *Attorney, Agent, or Firm* — White & Case LLP

(57) ABSTRACT

According to one embodiment, a disk device includes a disk-shaped recording medium, a base accommodating the recording medium, the base including a bottom wall, a sidewall on a peripheral portion of the bottom wall, and a rib on a part of an upper surface of the sidewall, a first cover on a part of the upper surface of the sidewall, and a second cover on a first surface of the rib and above the first cover. The rib includes a first region with a first width, a second region with a second width less than the first width, and the first surface with a fixed width around an entire circumference of the rib. The first region and the second region are located corresponding to a side portion of the recording medium.

11 Claims, 6 Drawing Sheets

(56) References Cited

U.S. PATENT DOCUMENTS

| | | | | |
|---|---|---|---|---|
| 7,876,528 B2* | 1/2011 | Uefune | ............... | G11B 25/043 |
| | | | | 360/97.22 |
| 7,957,092 B2* | 6/2011 | Ichikawa | ............. | G11B 25/043 |
| | | | | 360/99.2 |
| 8,279,552 B2* | 10/2012 | Stipe | .................... | G11B 25/043 |
| | | | | 360/99.18 |
| 8,659,849 B2* | 2/2014 | Hayakawa | ........... | G11B 33/148 |
| | | | | 360/97.22 |
| 8,854,766 B1* | 10/2014 | Gustafson | .......... | G11B 33/1486 |
| | | | | 360/97.12 |
| 9,779,779 B1* | 10/2017 | Okamoto | ........... | G11B 33/1446 |
| 9,818,454 B1* | 11/2017 | Albrecht | ............ | G11B 33/1466 |
| 9,852,777 B2* | 12/2017 | Albrecht | ............ | G11B 33/1466 |
| 2007/0008697 A1* | 1/2007 | Choi | .................... | G11B 25/043 |
| | | | | 361/679.36 |
| 2009/0241322 A1* | 10/2009 | Uefune | ................ | G11B 25/043 |
| | | | | 29/603.01 |
| 2013/0222947 A1* | 8/2013 | Sugii | ................... | G11B 23/505 |
| | | | | 360/99.08 |

* cited by examiner

ND COVER

CROSS-REFERENCE TO RELATED APPLICATIONS

This application is based upon and claims the benefit of priority from Japanese Patent Application No. 2018-168876, filed Sep. 10, 2018, the entire contents of which are incorporated herein by reference.

FIELD

Embodiments described herein relate generally to a disk device.

BACKGROUND

As a disk device, a magnetic disk drive comprises a housing including a base and a top cover, and the housing accommodates therein a rotatable magnetic disk, an actuator supporting a magnetic head and the like. As a technique of improving the performance of the disk drive, a method of reducing rotational resistances of the magnetic disk and the magnetic head, by sealing low-density gas in the housing, has been proposed.

In such a magnetic disk drive, the top cover is jointed to the base of the housing by welding to form an enclosed housing and increase the airtightness of the housing. The welding is carried out on along an entire outer circumference of the top cover. Here, in order to obtain high airtightness, it is necessary to maintain a stable welding quality all around the circumference. On the other hand, in the case where the outer diameter of the magnetic disk, the wall portion of the base needs to be formed thinner, which may accordingly decrease the area of the welded portion and degrade the welding quality.

DETAILED DESCRIPTION

Various embodiments will be described hereinafter with reference to the accompanying drawings. In general, according to one embodiment, a disk device comprises a disk-shaped recording medium; a base accommodating the recording medium, the base comprising a bottom wall, a sidewall on a peripheral portion of the bottom wall, and a rib on a part of an upper surface of the sidewall, the rib comprising a first region with a first width, a second region with a second width less than the first width, and a first surface with a fixed width around an entire circumference of the rib, the first region and the second region being located corresponding to a side portion of the recording medium; a first cover provided on a part of the upper surface of the sidewall; and a second cover provided on the first surface of the rib and provided above the first cover.

First Embodiment

Figure 1:
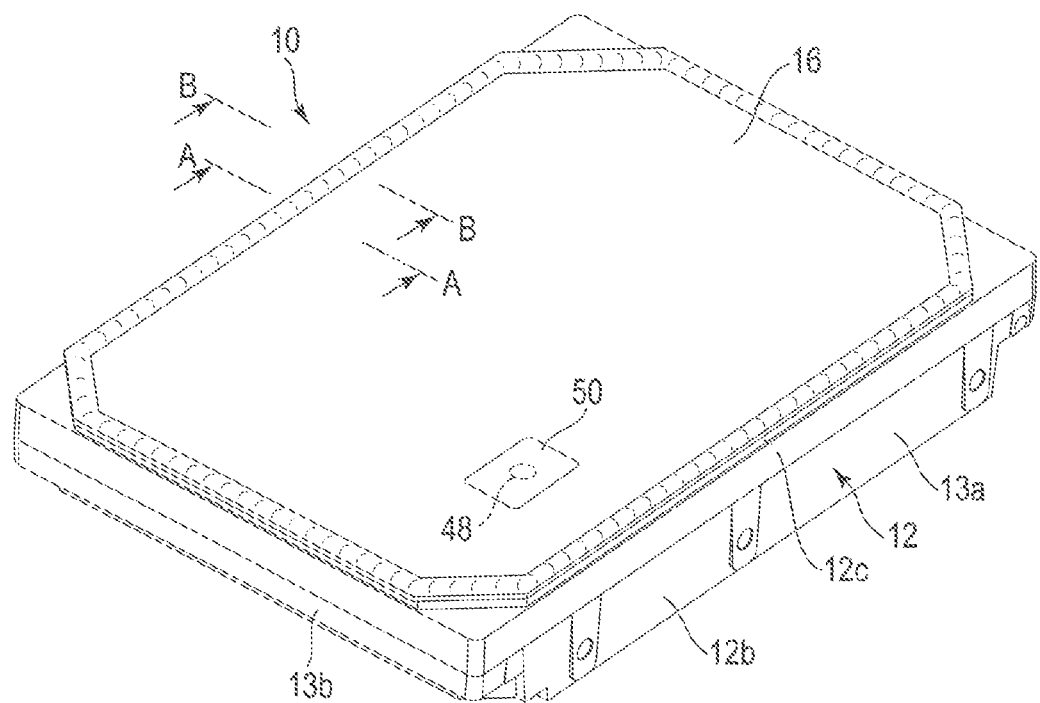
FIG. 1 is a perspective view showing a hard disk drive (HDD) according to a first embodiment.

As a disk device, a hard disk drive (HDD) according to the first embodiment will be described in detail. FIG. 1 is a perspective view showing the appearance of the HDD according to the embodiment, and FIGS. 2 and 3 are exploded perspective views of the HDD when decomposed.

As shown in FIGS. 3 and 5 to 7, the rectangular frame-shaped fixing rib 12c provided integrally on the upper end surfaces 38 of the sidewalls 12b comprises a flat ceiling surface (welding surface) (first surface) SW having a fixed height T1 all along the entire circumference. The fixing rib 12c is, in its most part, formed as a first region (broad portion) 30a having a first width W1 which is fixed. At least a portion of the fixing rib 12c, in this embodiment, three locations thereof constitute a second region (narrow region) 30b having a second width W2, which is less than the first width W1. The three narrow regions 30b are provided in three locations, which includes two locations on the right and left side of the long sidewall 13a located most adjacent to the outer circumferential edge of the magnetic disk 18 and the central portion of one short sidewall 13b. The second region 30b are each formed by, for example, cutting the inner surface (second surface) of the fixing rib 21c, which is on the side of the magnetic disk 18, into a long and slender rectangular recess portion 32, to narrow down the width of the fixing rib 12c. The recess portions 32 are each recessed in a direction away from the magnetic disk 18, to have a depth of, for example, about 0.1 to 0.3 mm. With the recess portions 32 thus provided, a bottom surface of each recess portion 32 serves as an installation surface flush with the mounting surface 38, and thus it becomes possible to keep wide the width of the mounting surface 38 abutted to the gasket 17 of the inner cover 14. The longitudinal length L1 of each second region 30b is, for example, about 20 to 40 mm. The length L1 is arbitrarily settable and can be changed if needed.

Figure 4:
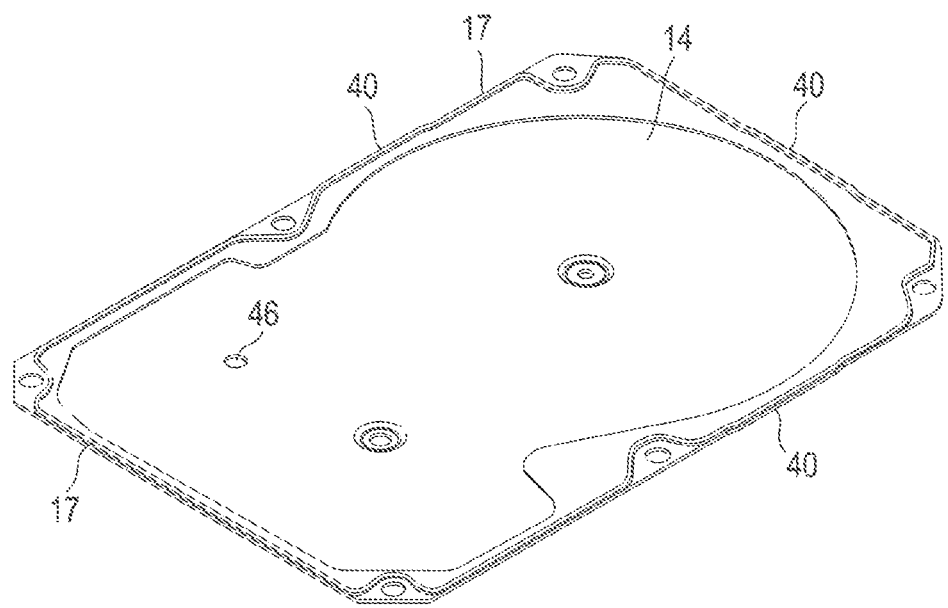
FIG. 4 is a perspective view showing an inner side of the inner cover.

The inner cover 14 is formed into a rectangular plate-shape from stainless steel, for example. The inner cover 14 has a shape and dimensions corresponding to those of the fixing rib 12c of the base 12. That is, the inner cover 14 has an outer circumferential shape corresponding to the inner circumferential shape of the fixing rib 12c and is formed to have outer dimensions slightly less than inner dimensions of the fixing rib 12c. As shown in FIG. 4, a rectangular frame-shaped gasket 17 or a sealing material is provided on an inner surface of the inner cover 14. The gasket 17 extends near and all along the outer circumferential edge of the inner cover 14. The gasket 17 is formed by applying a sealing material, for example, UV-curing resin or the like by a predetermined width on the inner surface of the inner cover 14, followed by curing.

Figure 2:
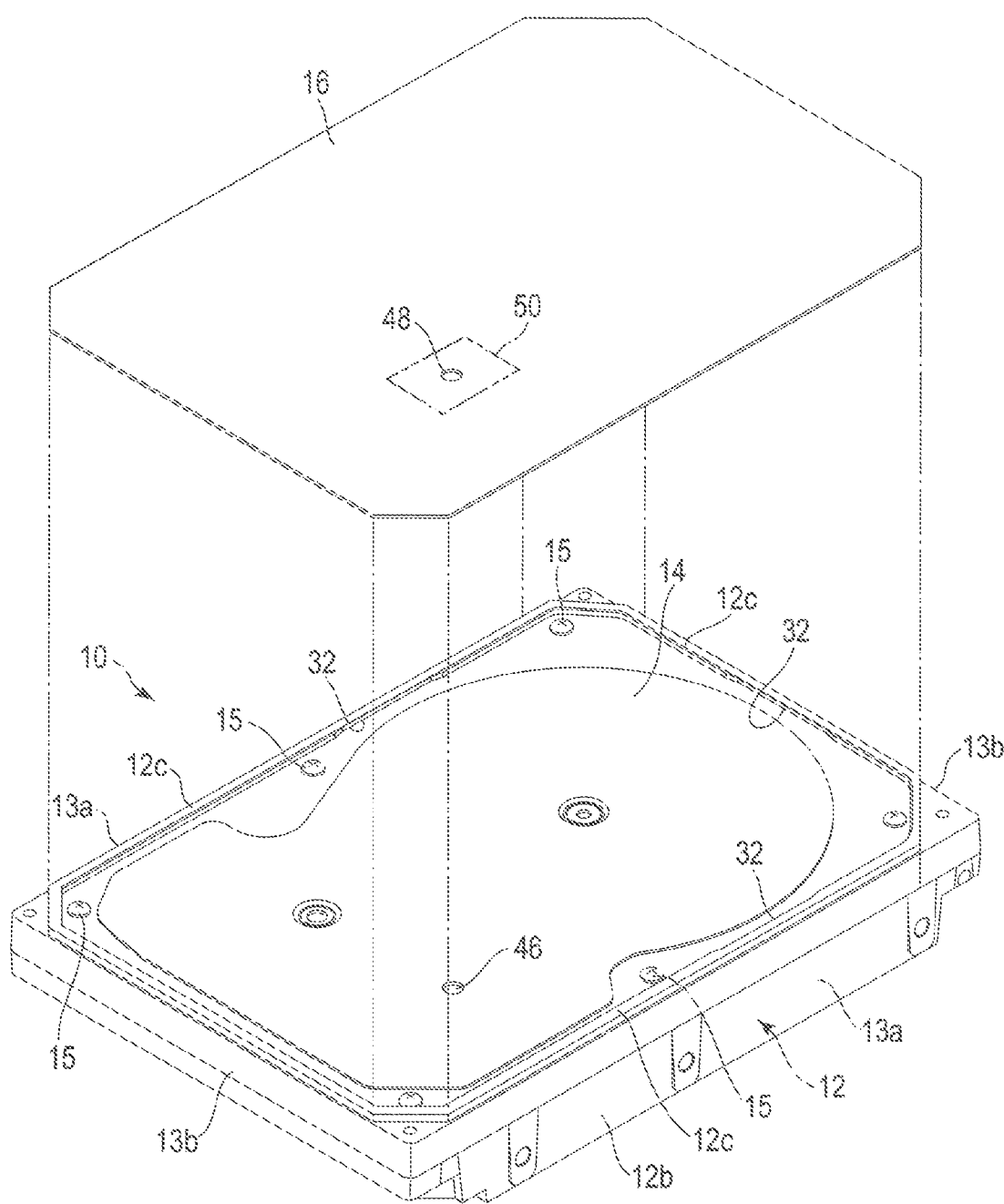
FIG. 2 is an exploded perspective view of the HDD while an outer cover thereof being removed.
Figure 3:
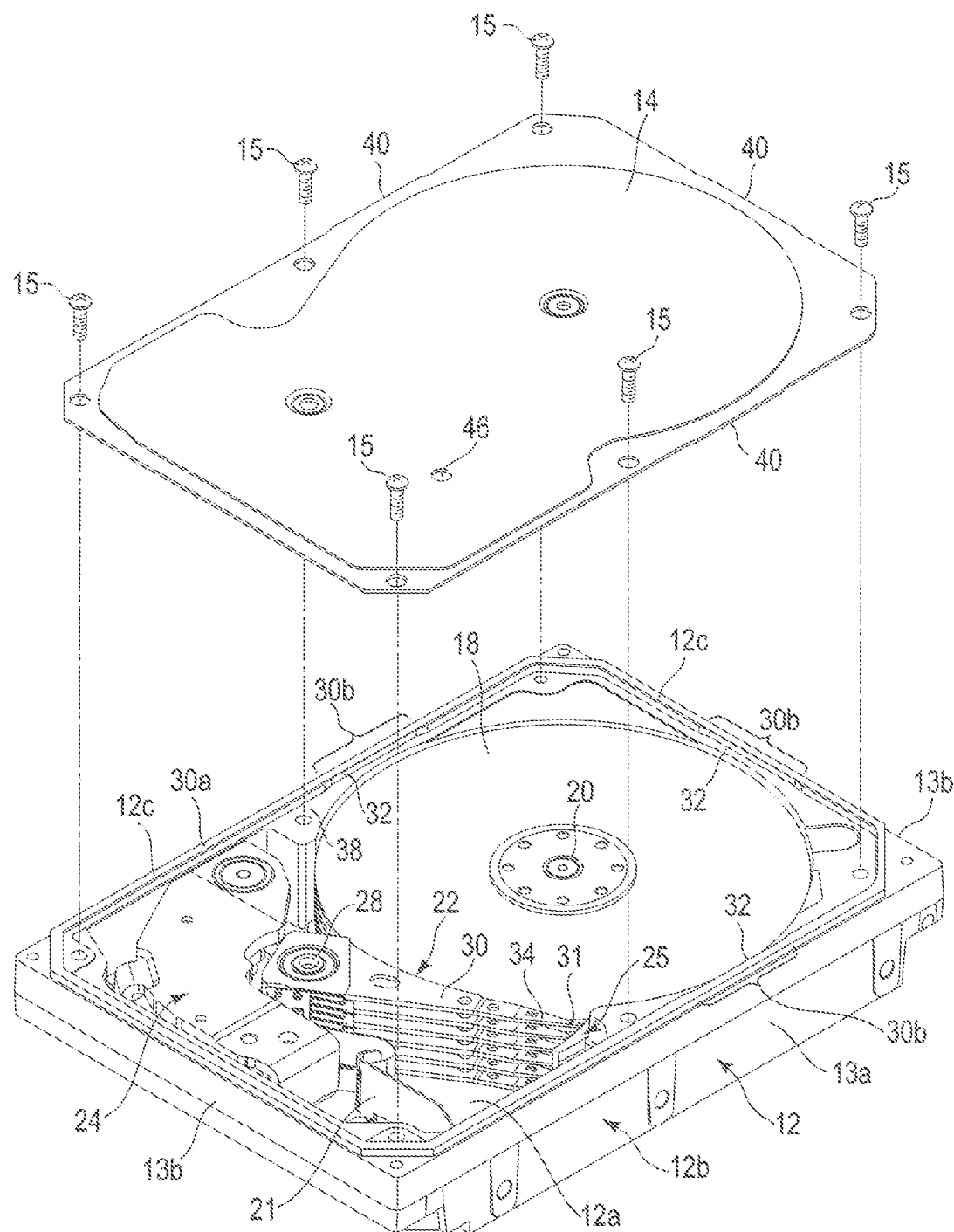
FIG. 3 is an exploded perspective view of the HDD while an inner cover thereof being removed.

As shown in FIGS. 2 and 3, the inner cover 14 is disposed on the upper end surface (the mounting surface) 38 of the sidewalls 12b and on an inner side of the fixing rib 12c. The circumferential portion of the inner cover 14 is placed on the mounting surface 38 of the sidewalls 12b via the gasket 17. A plurality of locations of the circumferential portion of the inner cover 14, that is, for example, four corner portions and a longitudinal central portion, are screwed to the upper end surfaces 38 of the sidewalls 12b with screws 15. Thus, the inner cover 14 airtightly closes the upper opening of the base 12. The side edges (side surfaces) of the inner cover 14 oppose the inner side surface (second surface) of the fixing rib 12c with a slight gap therebetween.

The fixing rib 12c is formed to have a height greater than the thickness of the inner cover 14. As shown in FIG. 2, in the state where the inner cover 14 is attached to the base 12, the fixing rib 12c protrude up over the inner cover 14.

As shown in FIGS. 1 and 2, the outer cover 16 is formed into a rectangular plate shape from aluminum alloy, for example. The outer cover 16 has an outer circumferential shape and dimensions substantially equal to the outer circumferential shape and outer dimensions of the fixing rib 12c. That is, the outer cover 16 is formed to be slightly greater in dimensions than the inner cover 14. The outer cover 16 is disposed on the fixing rib 12c, to cover the inner cover 14. The peripheral portion of the outer cover 16 is welded to the fixing rib 12c all around thereof and fixed airtightly to the base 12.

In the inner cover 14 and the outer cover 16, vent holes 46 and 48 through which the interior of the housing 10 and the exterior of the housing 10 are communicated with each other are formed, respectively. The air in the housing 10 is exhausted through the vent holes 46 and 48, and further, through these vent holes 46 and 48, a low-density gas (inert gas) having a density lower than that of air, for example, a helium, is enclosed in the housing 10. Then, a sealant (a sealing body) 50 is attached to the outer surface of the outer cover 16 so as to close the vent hole 48.

As shown in FIG. 3, in the housing 10, a plurality of magnetic disks 18 as recording media, and a spindle motor 20 as a drive unit which supports and rotates the magnetic disks 18 are provided. The spindle motor 20 is disposed on the bottom wall 12a. Each magnetic disk 18 is formed so as to have a diameter of, for example, 95 mm and comprises a magnetic recording layer on the upper surface and/or lower surface. The magnetic disks 18 are engaged coaxially with a hub (not shown) of the spindle motor 20, clamped by a clamp spring 27, and thereby fixed to the hub. In this manner, the magnetic disks 18 are supported in parallel to the bottom wall 12a of the base 12. The magnetic disks 18 are rotated at a predetermined number of revolutions by the spindle motor 20.

In this embodiment, five magnetic disks 18, for example, are accommodated in the housing 10. But, the number of magnetic disks 18 is not limited to five, and can be increased or decreased. Further, a single magnetic disk 18 may be accommodated in the housing 10.

In the housing 10, a plurality of magnetic heads 31, which record and reproduce information on and from the magnetic disks 18, and a head actuator assembly 22, which supports the magnetic heads 31 such that they are movable with respect to the magnetic disks 18, are provided. Further, the housing 10 accommodates a voice coil motor (hereinafter referred to as VCM) 24 which rotates and positions the head actuator assembly 22, a ramped loading mechanism 25 which holds the magnetic heads 31 at an unloading position away from the magnetic disks 18 when the magnetic heads 31 are moved to the outermost circumference of the magnetic disks 18, and a board unit 21 on which electronic components including a conversion connector are mounted.

The head actuator assembly 22 includes an actuator block 22 in which a bearing unit 28 is built, a plurality of arms 30 extending from the actuator block, and a suspension 34 extending from each of the arms 30, and the magnetic head 31 is supported by the distal end portion of each of the suspensions 34. The head actuator assembly 22 is supported pivotably by a pivot disposed to stand on the bottom wall 12a via the bearing unit 28.

Onto the outer surface of the bottom wall 12a, a printed circuit board (not shown) is fixed by screws. A control unit is formed on the printed circuit board and the control unit controls the operation of the spindle motor 20, and also controls the operation of the VCM 24 and the magnetic heads 31 via the board unit 21.

Next, the structure of the fixing rib 12c and the structure of a welded portion will be described in detail.

Figure 5:
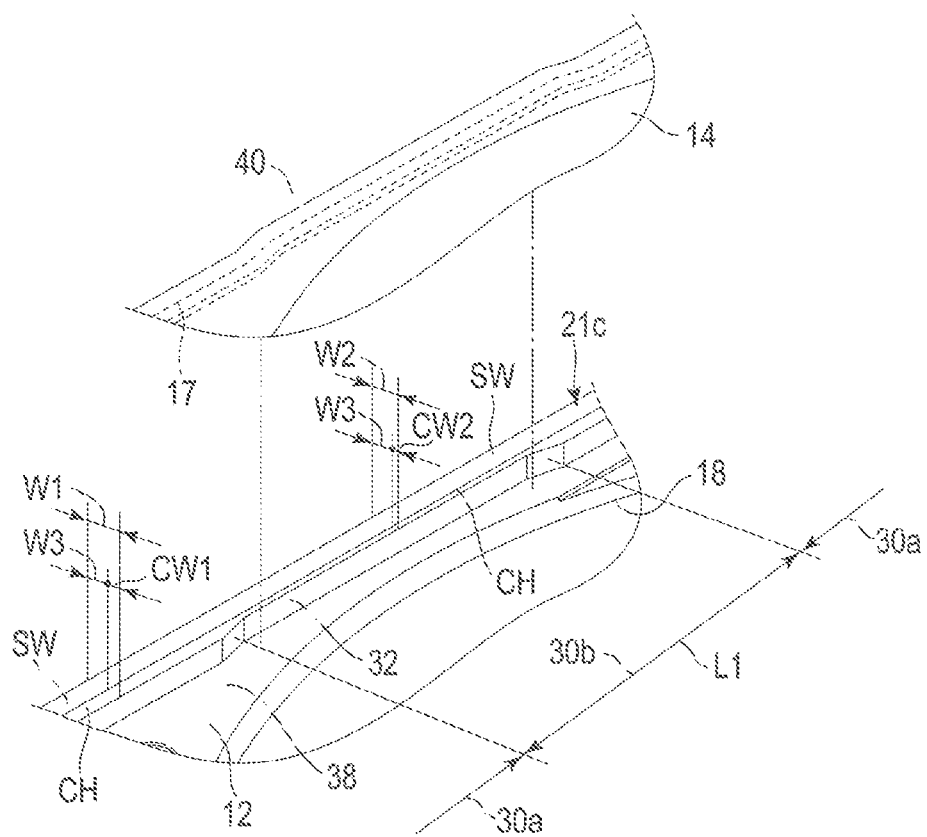
FIG. 5 is an exploded and enlarged perspective view of a recess portion of a base and a protruding portion of the inner cover.
Figure 6:
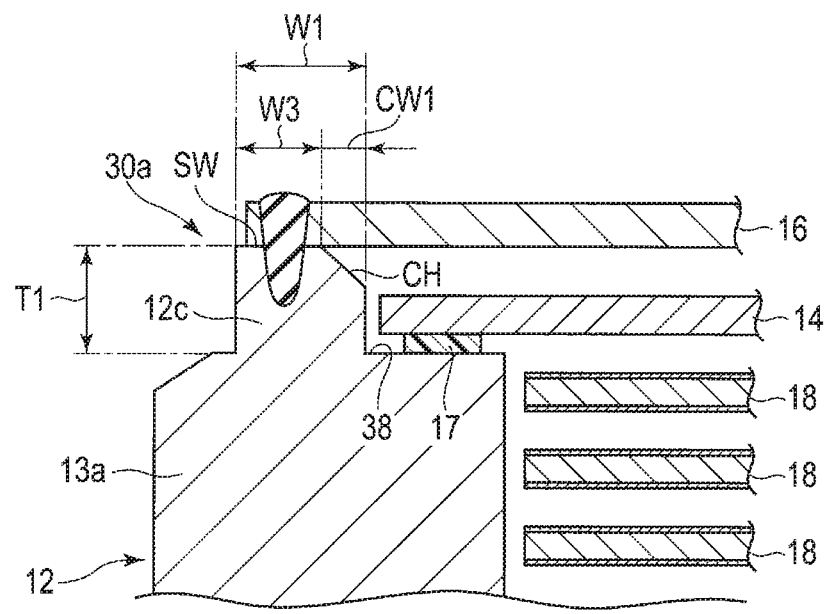
FIG. 6 is a cross sectional view of the HDD taken along line A-A of FIG. 1.
Figure 7:
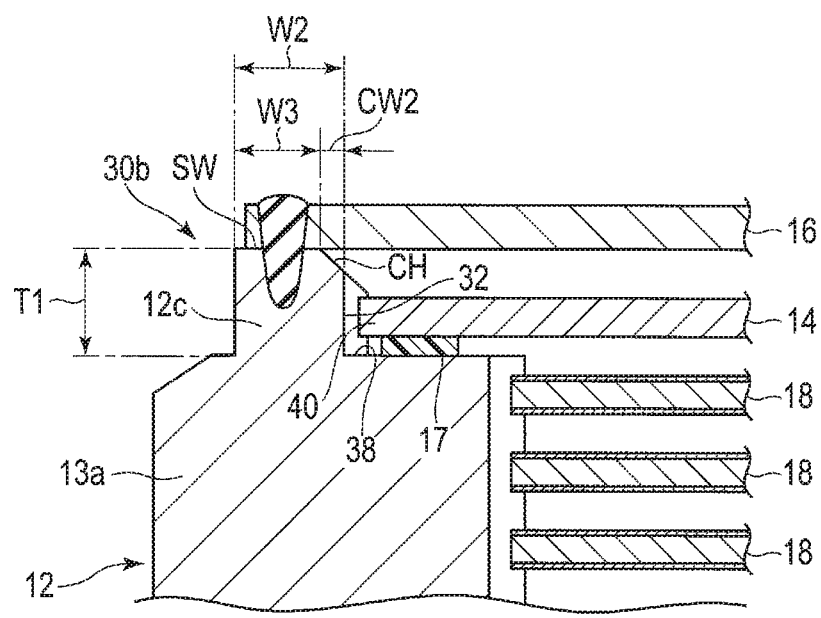
FIG. 7 is a cross sectional view of the HDD taken along line B-B of FIG. 1.

FIG. 5 is an exploded and enlarged perspective view of a recess portion of the base and a protruding portion of the inner cover. FIG. 6 is a cross sectional view of the HDD taken along line A-A of FIG. 1. FIG. 7 is a cross sectional view of the HDD taken along line B-B of FIG. 1.

As shown in FIGS. 3 and 5 to 7, the rectangular frame-shaped fixing rib 12c provided integrally on the upper end surfaces 38 of the sidewalls 12b comprises a flat ceiling surface (welding surface) (first surface) SW having a fixed height T1 all along the entire circumference. The fixing rib 12c is, in its most part, formed as a first area (broad portion) 30a having a first width W1 which is fixed. At least a portion of the fixing rib 12c, in this embodiment, three locations thereof constitute a narrow region (second region) 30b having a second width W2, which is less than the first width W1. The three narrow regions 30b are provided in three locations, which includes two locations on the right and left side of the long sidewall 13a located most adjacent to the outer circumferential edge of the magnetic disk 18 and the central portion of one short sidewall 13b. The narrow regions 30b are each formed by, for example, cutting the inner surface (second surface) of the fixing rib 21c, which is on the side of the magnetic disk 18, into a long and slender rectangular recess portion 32, to narrow down the width of the fixing rib 12c. The recess portions 32 are each recessed in a direction away from the magnetic disk 18, to have a depth of, for example, about 0.1 to 0.3 mm. With the recess portions 32 thus provided, a bottom surface of each recess portion 32 serves as an installation surface flush with the mounting surface 38, and thus it becomes possible to keep wide the width of the mounting surface 38 abutted to the gasket 17 of the inner cover 14. The longitudinal length L1 of each narrow region 30b is, for example, about 20 to 40 mm. The length L1 is arbitrarily settable and can be changed if needed.

The inner circumferential corner portions of the fixing rib 21c, i.e., the corner portions where the ceiling surface and the inner surface intersect each other, are each cut off at a predetermined angle, to form a C surface (chamfered surface) (third surface) CH having a predetermined width. The C surface CH is formed all around the circumference of the fixing rib 21c in both of the first region 30a and the second region 30b. In this case, a width CW2 of the C surface CH in the second region 30b is less than a width CW1 of the C surface CH in the first region 30a. Thus, the flat ceiling surface (welding surface) (first side) SW which remains in the fixing rib 21c is formed to have a fixed width W3 all around the entire circumference. That is, in any region of the first region 30a and the second region 30b, a welding surface SW having the width W3 is maintained.

The peripheral portion of the outer cover 16 is placed on the welding surface SW of the fixing rib 21c and welded to the welding surface SW by, for example, laser welding. The welding surface SW is formed to have a fixed width W3 all around the entire circumference of the fixing rib 21c and the welding surface SW of the constant width W3 is maintained in each second region 30b as well. With this structure, the peripheral portion of the outer cover 16 can be welded to the fixing rib 12c in a stable manner, and the first region 30a and the second region 30b can maintain high welding quality. Although the width W3 of the welding surface SW may slightly vary upon welding the outer cover 16 to the welding surface SW, the welding surface SW maintains a substantially fixed width W3 all around the entire circumference of the fixing rib after welding.

On the other hand, as shown in FIGS. 2 and 5 to 7, the inner cover 14 comprises three projecting portions 40 integrated to the cover 14, which respectively correspond to the recess portions 32 of the fixing rib 21c. In other words, the projecting portions 40 are formed respectively in the long sides and a central portion of a short side of the inner cover 14. The length and the height of each projecting portion 40 are set slightly less than the length and recession of the recess portions (narrow regions) 32. The projection height is, for example, about 0.1 to 0.2 mm.

As shown in FIG. 4, the gasket 17 provided on the inner surface of the inner cover 14 is turned outwards in the locations of the projecting portions, and extends along the end edges of the projecting portions. While the inner cover 14 is fixed by screwed to the upper end surfaces (mounting surfaces) 38 of the sidewalls 12b, the projecting portions 40 are located in the respective recess portions 32 of the corresponding second region 30b, and further tightly attached onto the mounting surface 38 via the gasket 17.

According to the HDD configured as described above, even in the case where the diameter of the magnetic disk 18 is increased and the thickness of the sidewalls 12b of the base 12 is decreased, recess portions 32 are made in locations of the fixing rib 21c, which correspond to the thin portions, to form the second region 30b, and further the chamfer width of the second region 30b is set less than the chamfer width of the first regions 30a. In this manner, a sufficient width of the welding surface can be maintained for the fixing rib. Thus, the peripheral portion of the outer cover 16 can be welded to the sidewalls 12b of the base 12 while maintaining high welding quality all around the entire circumference. Therefore, the magnetic disk can be increased in diameter and the storage capacity can be increase while maintaining the welding quality. Moreover, with the recess portions 32 thus provided, the width of the mounting surfaces can be expandable by the depth of the recess portions 32. With this structure, even in the regions where the sidewalls 12b are thin, the gasket 17 of the inner cover 14 is reliably brought into contact with the mounting surfaces of the sidewalls, thereby making it possible to keep high airtightness. At the same time, the gasket 17 can be disposed to be apart from the outer circumferential edge of the magnetic disk 18 by only a predetermined distance.

In the embodiment described above, the C surface is formed all around the entire circumference of the fixing rib 21c, burrs and the like, which may be produced at the time of manufacture can be removed, and therefore the flatness of the welding surface SW can be secured. Therefore, it is possible to suppress the degrading of the flatness of the welding surface or deterioration in welding quality, caused by burrs.

Next, an HDD according to another embodiment will be described. In the embodiment to be described below, the same structural members will be denoted by the same reference numbers as those of the first embodiment provided above, and the detailed explanations thereof will be omitted. Only the parts different from those of the first embodiment will be mainly described in detail.

Second Embodiment

Figure 8:
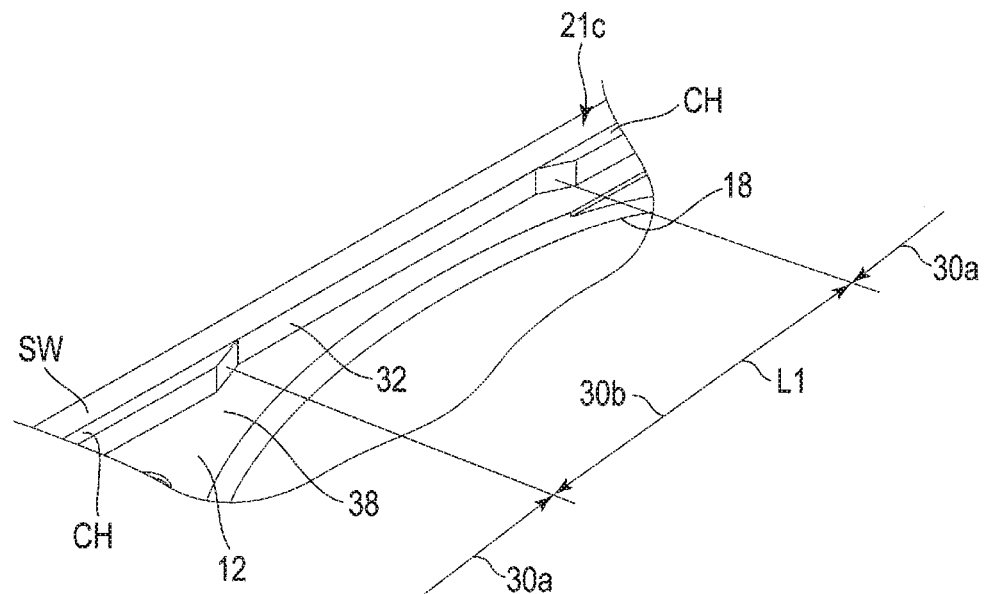
FIG. 8 is an enlarged perspective view showing a side wall portion of an HDD according to a second embodiment.
Figure 9:
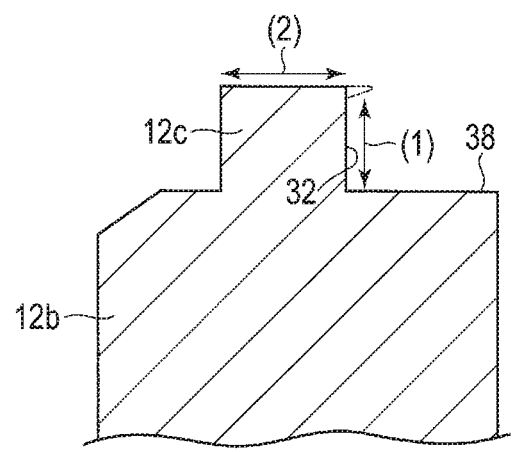
FIG. 9 is a cross-sectional view schematically showing a side wall portion, to illustrate a step of processing the side wall portion.

FIG. 8 is a partially enlarged perspective view showing a base of an HDD according to the second embodiment and FIG. 9 is a cross-sectional view schematically showing the base to illustrate a step of processing sidewalls of the base.

As shown in FIG. 8, only the first region 30a of the fixing rib 21c provided on a sidewall 12b may be chamfered to form a C surface (third surface) CH without chamfering the second region 30b. In other words, such a structure that the second region 30b does not comprise a C surface may be accepted. When not chamfering, there may be a case where burrs remain in a corner portion of the second region 30b. To avoid this, when processing the fixing rib 12c of the base 12, it is preferable to, first, cut the surface where burrs are created in the second region 30b to remove the burrs, and thereafter cut the other surfaces as shown in FIG. 9. For example, when burrs are created on the welding surface SW of the second region 30b, it is preferable to cut the welding surface CW first, and then cut the inner side surface of the fixing rib 21c, that is, the bottom surface of the recess portion 32. On the other hand, when burrs are created on the inner surface of the fixing rib 21c, it suffices if the inner side surface is cut first, and then the welding surface CW is cut.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The locations where the second region are formed in the fixing rib of the housing are not limited to those of the embodiments provided above, but these regions may be provided in any locations. Further, the second region of the fixing rib are not limited to three, but there may be one, or two or four or more regions. The materials, shapes and sizes of elements constituting the disk drive can be changed as needed. In the magnetic disk device, the number of magnetic disks and magnetic heads can be changed as needed. The size of the magnetic disks can be selected in various ways.

What is claimed is:
1. A disk device comprising:
a disk-shaped recording medium;
a base accommodating the recording medium, the base comprising a bottom wall, a sidewall on a peripheral portion of the bottom wall, and a rib on a part of an upper surface of the sidewall, the rib comprising a first region with a first width and a second region with a second width less than the first width, and a first surface with a fixed width around an entire circumference of the rib, the first region and the second region being located corresponding to a side portion of the recording medium;

a first cover provided on a part of the upper surface of the sidewall; and a second cover provided on the first surface of the rib and provided above the first cover.

2. The disk device of claim 1, wherein
the rib comprises a second surface provided on an inner side portion of the rib, and a third surface provided between the first surface and the second surface.

3. The disk device of claim 2, wherein
the third surface of the rib is provided only between the first surface and the second surface in a first region of the rib.

4. The disk device of claim 2, wherein
the third surface has a width in the second region, which is less than a width of the third surface in the first region.

5. The disk device of claim 1, wherein
the rib comprises a recess portion in which the second region comprises a bottom portion, and
the first cover comprises, in an outer peripheral portion thereof, a projecting portion corresponding to the recess portion of the rib.

6. The disk device of claim 1, wherein
the sidewall of the base comprises a pair of long sidewalls, and a pair of short sidewalls, and the second region of the rib is provided on each of the long sidewalls and one of the short sidewalls.

7. The disk device of claim 1, wherein
a gas of a density lower than that of air is sealed with the base and the first cover.

8. The disk device of claim 2, wherein
the sidewall of the base comprises a pair of long sidewalls, and a pair of short sidewalls, and the second region of the rib is provided on each of the long sidewalls and one of the short sidewalls.

9. The disk device of claim 2, wherein
a gas of a density lower than that of air is sealed with the base and the first cover.

10. The disk device of claim 1, wherein
the second region is more closer to the side portion of the recording medium than the first region.

11. The disk device of claim 1, wherein
the rib is formed integrally with the sidewall.

\* \* \* \* \*